Sept. 8, 1959
V. G. LOHSE
2,903,024
MULTIPLE MEASURING DISPENSER
Filed May 16, 1957
2 Sheets-Sheet 2
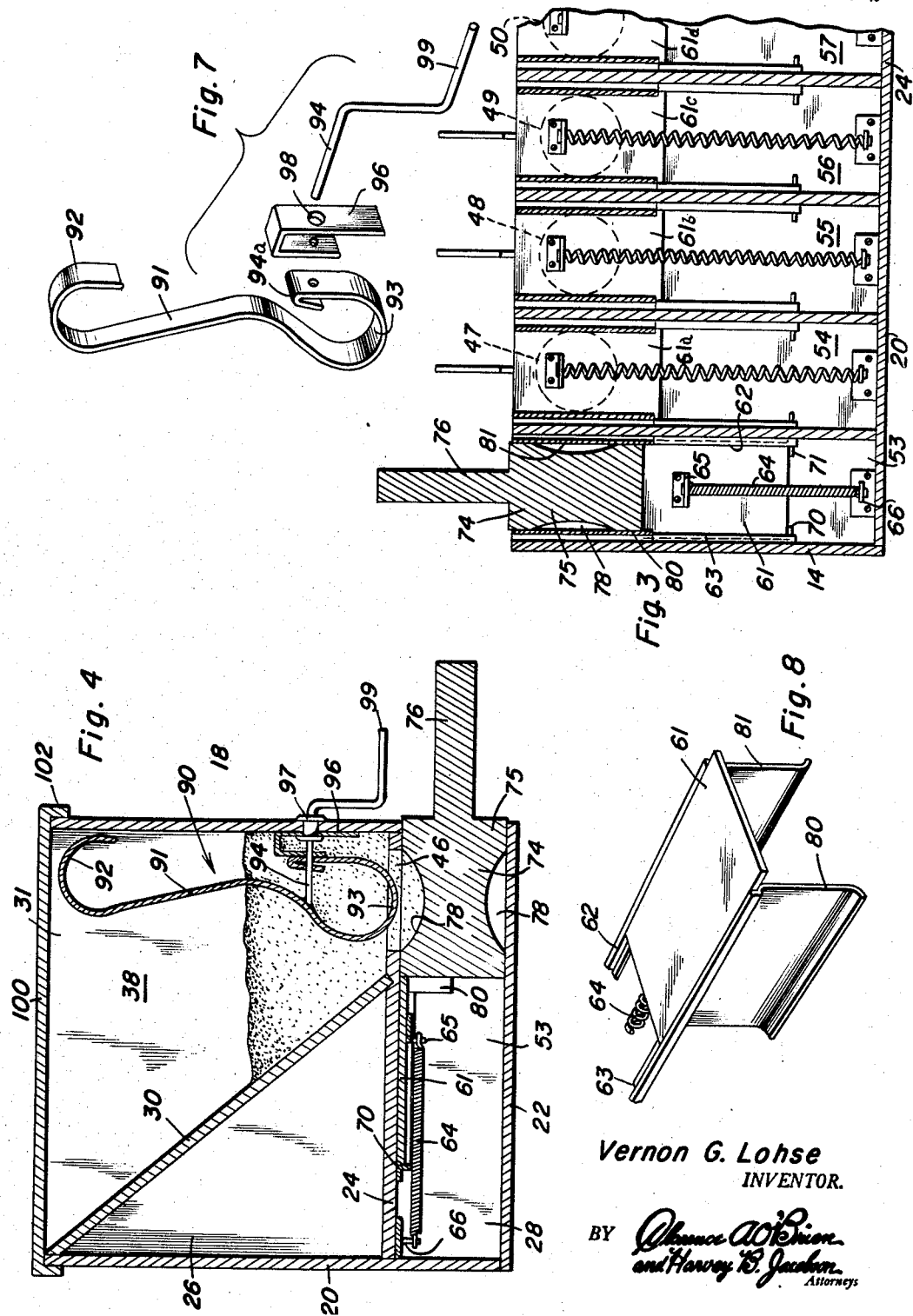
Vernon G. Lohse
INVENTOR.
BY
*Attorneys*

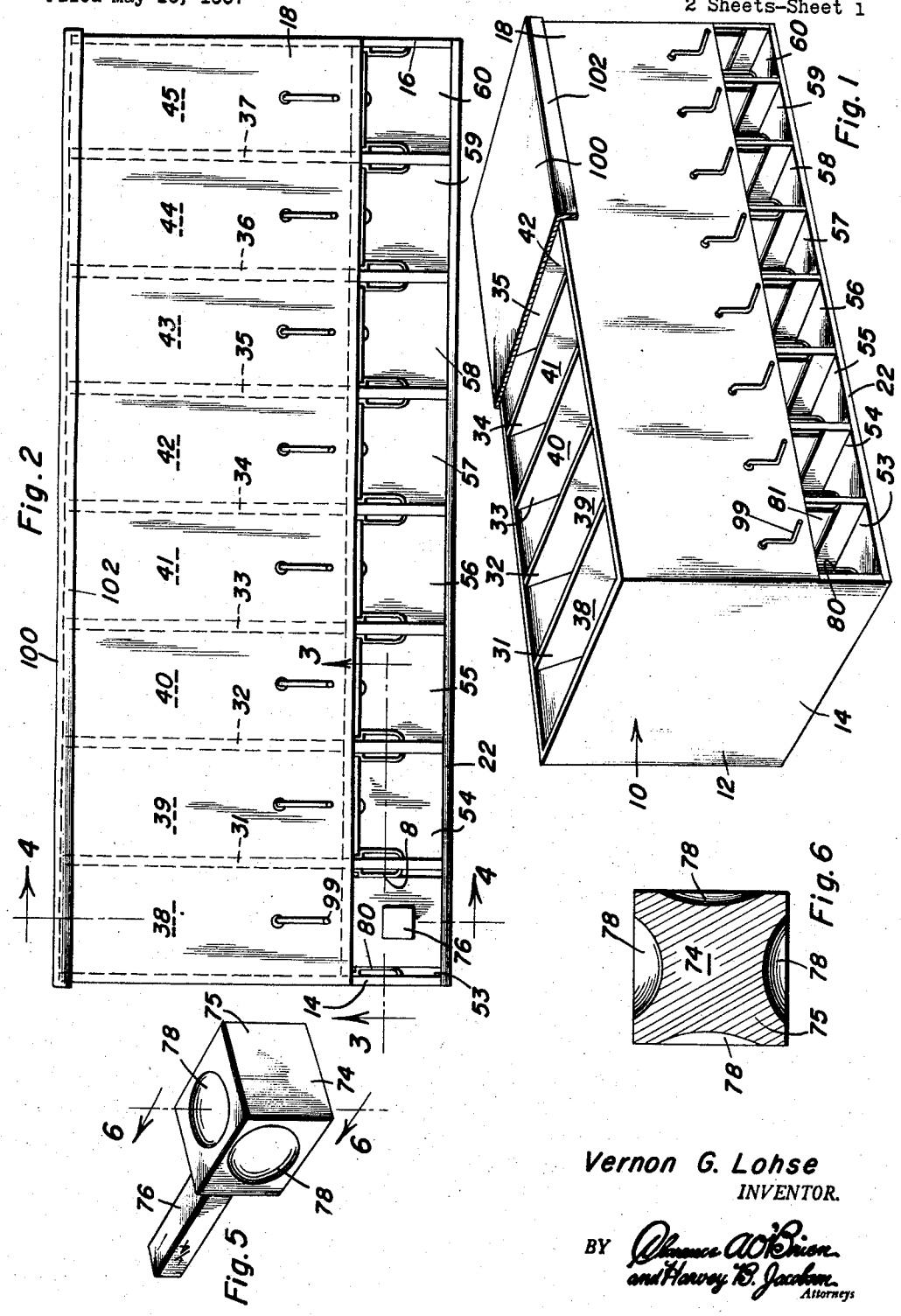

United States Patent Office 2,903,024
Patented Sept. 8, 1959

2,903,024

MULTIPLE MEASURING DISPENSER

Vernon G. Lohse, Alamo, N. Dak.

Application May 16, 1957, Serial No. 659,578

2 Claims. (Cl. 141—100)

This invention relates to a dispenser and more particularly to a dispenser whose principal function is to dispense spices and like granular substances.

An object of the invention is to provide a dispenser capable of discharging granular material, the dispenser being combined with a convenient block measure by which selected quantities of the granular material are extracted. The result is that measuring spoons are unnecessary. Moreover, my invention is so arranged that by inserting the block measure in the proper place in the dispenser, only the correct amount of granular material is discharged in the measure.

A further object of the invention is to provide a dispenser for granular material or powdered material, the dispenser including one and preferably a group of bins, each having an individual valve at the lower extremity thereof which is automatically opened in response to the application of the measure, the valve being automatically closed when the measure is withdrawn, thereby preventing the loss of and the untidiness connected with leakage of granular material.

Another object of the present invention is to provide a dispenser which is convenient and practical, the dispenser being adapted to be mounted on a cupboard, cabinet or other support so as to save time in the use thereof. Ordinarily, spices have to be withdrawn from containers or from cans that require the tops to be opened and closed. With a dispenser in accordance with my invention, the spices are as close and handy as it is to insert the measure and withdraw the same.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a dispenser in accordance with the invention, parts of the top being broken away in section to illustrate the interior of some of the bins;

Figure 2 is a front view of the dispenser in Figure 1;

Figure 3 is a fragmentary horizontal sectional view taken on the line 3—3 of Figure 2;

Figure 4 is a vertical transverse sectional view taken on the line 4—4 of Figure 2;

Figure 5 is a perspective view of the block measure which constitutes a part of the invention;

Figure 6 is a vertical transverse, sectional view taken on the line 6—6 of Figure 5;

Figure 7 is an exploded, perspective view of one of the agitators which constitutes a part of the dispenser; and Figure 8 is a fragmentary, perspective view of the valve and trackage which accepts the block measure.

In the accompanying drawings there is a dispenser 10 which is constructed in accordance with the invention. This dispenser consists of a housing 12 that has end walls 14 and 16, a front wall 18, a back wall 20 and a bottom wall 22. A transverse panel 24 is attached to the back wall 20 and the front wall 18 and separates the housing 12 into a bin section 26 and a discharge section 28 for the granular or powdered material. An angulated baffle 30 extends from the upper edge of the back wall 20 to a point on the panel 24 spaced from front wall 18. The baffle 30 is joined to the panel 24 at this point. Seven transverse partitions 31, 32, 33, 34, 35, 36 and 37 extend from the front wall 18 to the angulated baffle 30 and separate the housing 12 into eight bins 38, 39, 40, 41, 42, 43, 44 and 45. Each bin is adapted to contain a granular, powdery or other fluent material, and each bin has a discharge opening, for example, openings 46, 47, 48, 49 and 50 for the bins 38, 39, 40, 41 and 42. The openings are formed in the panel 24 at the lower end of the individual bins which they service.

The partitions 31, 32, 33, 34, 35, 36 and 37 extend to the bottom 24 of the housing and thereby define individual chambers 53, 54, 55, 56, 57, 58, 59 and 60 beneath the bins 38, 39, 40, 41, 42, 43, 44 and 45. Valves 61, 61a, 61b, 61c and 61d are slidably disposed beneath the chambers 38, 39, 40, 41 and 42 and like valves are provided for the remainder of the chambers. The purpose of the valves is to control the discharge openings of the bins. They are mounted in tracks attached beneath the panel 24, for example, see valve 61 (Figure 8), inasmuch as it is identical to the remainder of the valves. The valve 61 is made of a flat plate which is slidably disposed on rails 62 and 63, the rails being of angular formation and fixed to the upper surface in chamber 53. Spring 64 is attached to a hanger 65 on the lower surface of valve 61 and is attached to a hanger 66 which is secured to the panel 24. The spring 64 normally holds the valve 61 in a position to cover the discharge opening 46, but is capable of compressing to an inmost position defined by stops 70 and 71 (Figure 3) at the inner extremities of the rails 62 and 63. At this point the measure is located correctly and centered beneath the discharge opening 46.

Measure 74 consists of a block 75 having a handle 76 protruding from one end thereof. The block is square in cross section and the four faces have recesses 78 therein, the recesses being of different sizes, for example, one teaspoon, a half teaspoon, a quarter of a teaspoon and an eighth of a teaspoon respectively. Therefore, the indicia on the handle 76 may be read to determine which recess is to be registered with the opening 46 and consequently how much material from bin 38 is to be deposited therein. The cross sectional dimension of the measure 74 is such that it fits snugly within the vertical dimension of chamber 53 and presses neatly against the guides 80 and 81 which depend from rails 62 and 63 and which are located on the sides of the chamber 53 (Figure 2). The length dimension of the measure is such that when pushed all the way in, that is, when the valve 61 contacts its stops, the recess 78 is properly registered with the discharge opening 46. The thickness of the measure is such that it cannot slide by valve 61 and must operate it against the yielding spring opposition each time that the measure is inserted in any one of the dispensing chambers.

An individual agitator is disposed in each of the bins. Alternatively, one agitator may be used for all of the bins. Agitator 90 in bin 38 is typical of each of the others. It consists of a spring metal bar 91 having an ovate upper end 92 and an ovate lower end 93. Clamp 94a is formed by a return bend at the extremity of ovate end 93 and has a pair of aligned openings therein through which the inner end of crank 94 passes. This crank also passes through aligned openings in substantially U-shaped hanger 96 that is welded or otherwise secured to the inner surface of the front 18 of the housing. The crank inner end 94 passes through a bushing 97 in one of the apertures 98 of hanger 96 and in an aperture formed in the front wall 18. The inner extremity of crank 94 is welded or otherwise fixed to the bar 91. Therefore, when the handle 99 of the crank is oscillated, the bar 91 and its ovate ends, one of which protrudes into the discharge opening 46, function as a shaker or agitator.

A cover 100 having a depending flange 102 around the perimeter thereof is removably seated on the upper open top of the housing and covers all of the bins simultaneously.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A dispenser for granular material comprising a housing with a pair of spaced vertically extending walls therein defining therebetween a bin, a horizontal panel in said housing constituting the bottom of said bin and having a discharge opening therethrough, said housing having a chamber beneath said panel, a measure body slidable in said chamber between said walls and beneath said discharge opening, a flat plate comprising a valve in said chamber carried by said panel and controlling said opening, said measuring body having a flat top surface slidably engaging the bottom surface of said panel and having in said top surface a recess of predetermined volume registrable with said opening for receiving therethrough a measured quantity of material from said bin, a pair of L-shaped rails secured to and supported by the underside of said panel and slidably receiving and supporting said valve, a pair of plate-like members dependingly supported by said rails and disposed upon the adjacent surfaces of said walls and above the bottom edges thereof and engaging and slidably guiding the opposite sides of said body, said valve and said body having adjacent portions disposed for abutting engagement, spring means secured to said valve and said panel urging said valve into position closing said opening and yieldable to enable movement of said body into position with said recess in registry with said opening to cause movement of said valve to uncover said opening, stop means on said valve and on the underside of said panel limiting movement of said valve and body to effect correct registry of said recess and opening.

2. A dispenser for granular material comprising a housing with a plurality of vertically extending partitions therein defining a plurality of bins in side by side relation, a horizontal panel in said housing constituting the bottom of all of said bins and having beneath each bin a discharge opening, said housing including a chamber beneath each opening and bin, a measure body slidably disposed in each chamber beneath the discharge opening thereof, a flat plate comprising a valve slidably carried by said panel in each chamber and controlling the opening thereof, each measuring body having a flat top surface slidably engaging the bottom surface of said panel and having in said top surface a recess of predetermined volume registrable with its opening for receiving therethrough a measured quantity of material from said bin, a pair of L-shaped rails in each chamber secured to and supported by the underside of said panel and slidably receiving and supporting a valve, a pair of plate-like members dependingly supported each by one of said pair of rails and disposed upon the adjacent surfaces of the walls of its chambers and above the bottom of the latter and engaging and slidably guiding the opposite sides of said body, the valve and body in each chamber having adjacent portions disposed for abutting engagement, spring means in each chamber secured to a valve and to said panel and urging said valve into opening closing position and yieldable to enable movement of said body into position with said recess registering with said opening whereby to cause movement of said valve uncovering said opening, stop means in each chamber on said valve and on the underside of said panel limiting movement of said valve and body whereby to effect correct registry of said recess and opening.

References Cited in the file of this patent

UNITED STATES PATENTS

| | | |
|---|---|---|
| 262,214 | Fleming | Aug. 8, 1882 |
| 702,083 | Wormwood | June 10, 1902 |
| 733,628 | Cramer | July 14, 1903 |
| 1,419,338 | Weineke | June 13, 1922 |
| 2,785,831 | Smolin | Nov. 19, 1957 |